US012197150B2

(12) United States Patent
Matsuda et al.

(10) Patent No.: US 12,197,150 B2
(45) Date of Patent: Jan. 14, 2025

(54) FIXING DEVICE AND IMAGE FORMING APPARATUS INCORPORATING THE SAME

(71) Applicants: Ryohei Matsuda, Kanagawa (JP); Yoshiki Yamaguchi, Kanagawa (JP); Takashi Seto, Kanagawa (JP); Hiroshi Yoshinaga, Chiba (JP); Ryohhei Sugiyama, Kanagawa (JP)

(72) Inventors: Ryohei Matsuda, Kanagawa (JP); Yoshiki Yamaguchi, Kanagawa (JP); Takashi Seto, Kanagawa (JP); Hiroshi Yoshinaga, Chiba (JP); Ryohhei Sugiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/523,956

(22) Filed: Nov. 30, 2023

(65) Prior Publication Data

US 2024/0176265 A1 May 30, 2024

(30) Foreign Application Priority Data

Nov. 30, 2022 (JP) ................................ 2022-192036

(51) Int. Cl.
*G03G 15/20* (2006.01)

(52) U.S. Cl.
CPC ..... *G03G 15/2007* (2013.01); *G03G 15/2064* (2013.01)

(58) Field of Classification Search
CPC ...................... G03G 15/2007; G03G 15/2064
USPC ................................ 399/122, 320, 328, 329
See application file for complete search history.

(56) References Cited

U.S. PATENT DOCUMENTS

| | | | | |
|---|---|---|---|---|
| 10,955,780 | B2 * | 3/2021 | Seshita | G03G 15/2064 |
| 11,448,988 | B2 * | 9/2022 | Saito | G03G 15/2064 |
| 2017/0248879 | A1 | 8/2017 | Ishigaya et al. | |
| 2023/0229104 | A1 | 7/2023 | Yamaguchi | |

FOREIGN PATENT DOCUMENTS

| | | | |
|---|---|---|---|
| JP | 2016-166921 | A | 9/2016 |
| JP | 2017-151286 | A | 8/2017 |
| JP | 2020-126212 | A | 8/2020 |
| JP | 2021-167983 | A | 10/2021 |
| JP | 2022039054 | * | 3/2022 |

* cited by examiner

*Primary Examiner* — Hoan H Tran
(74) *Attorney, Agent, or Firm* — XSENSUS LLP

(57) ABSTRACT

A fixing device includes a fixing rotator, a pressure rotator, a fixing nip support, a heat source, and a reflector. The pressure rotator contacts an outer face of the fixing rotator to form a nip through which a recording medium conveyed in a conveyance direction passes. The fixing nip support has a receiving portion to receive a pressing force of the pressure rotator. The heat source inside a loop of the fixing rotator has a heat generation area having a first length in a width direction orthogonal to the conveyance direction. The reflector includes a contacting portion contacting the receiving portion of the fixing nip support and a reflecting portion facing the heat source to reflect radiant heat radiated by the heat source toward an inner face of the fixing rotator. The reflecting portion has a second length in the width direction longer than the first length.

12 Claims, 8 Drawing Sheets

FIXING DEVICE AND IMAGE FORMING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2022-192036, filed on Nov. 30, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

One type of image forming apparatus includes a fixing device. The fixing device includes a fixing rotator, a pressure rotator, a fixing nip member, a heat source, and a reflector. The pressure rotator is in contact with the outer circumferential face of the fixing rotator to form a nip through which a recording medium passes and press the recording medium. The fixing nip member receives the pressing force from the pressure rotator via the fixing rotator. The heat source is inside a loop of the fixing rotator. The reflector reflects radiant heat radiated from the heat source to the inner circumferential face of the fixing rotator.

SUMMARY

This specification describes an improved fixing device that includes a fixing rotator, a pressure rotator, a fixing nip support, a heat source, and a reflector. The pressure rotator contacts an outer face of the fixing rotator to form a nip through which a recording medium conveyed in a conveyance direction passes and presses the recording medium against the fixing rotator. The fixing nip support has a receiving portion to receive a pressing force of the pressure rotator via the fixing rotator. The heat source is inside a loop of the fixing rotator and has a heat generation area. The heat generation area has a first length in a width direction orthogonal to the conveyance direction. The reflector includes a contacting portion and a reflecting portion. The contacting portion contacts the receiving portion of the fixing nip support. The reflecting portion faces the heat source to reflect radiant heat radiated by the heat source toward an inner face of the fixing rotator. The reflecting portion has a second length in the width direction longer than the first length of the heat generation area in the width direction.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
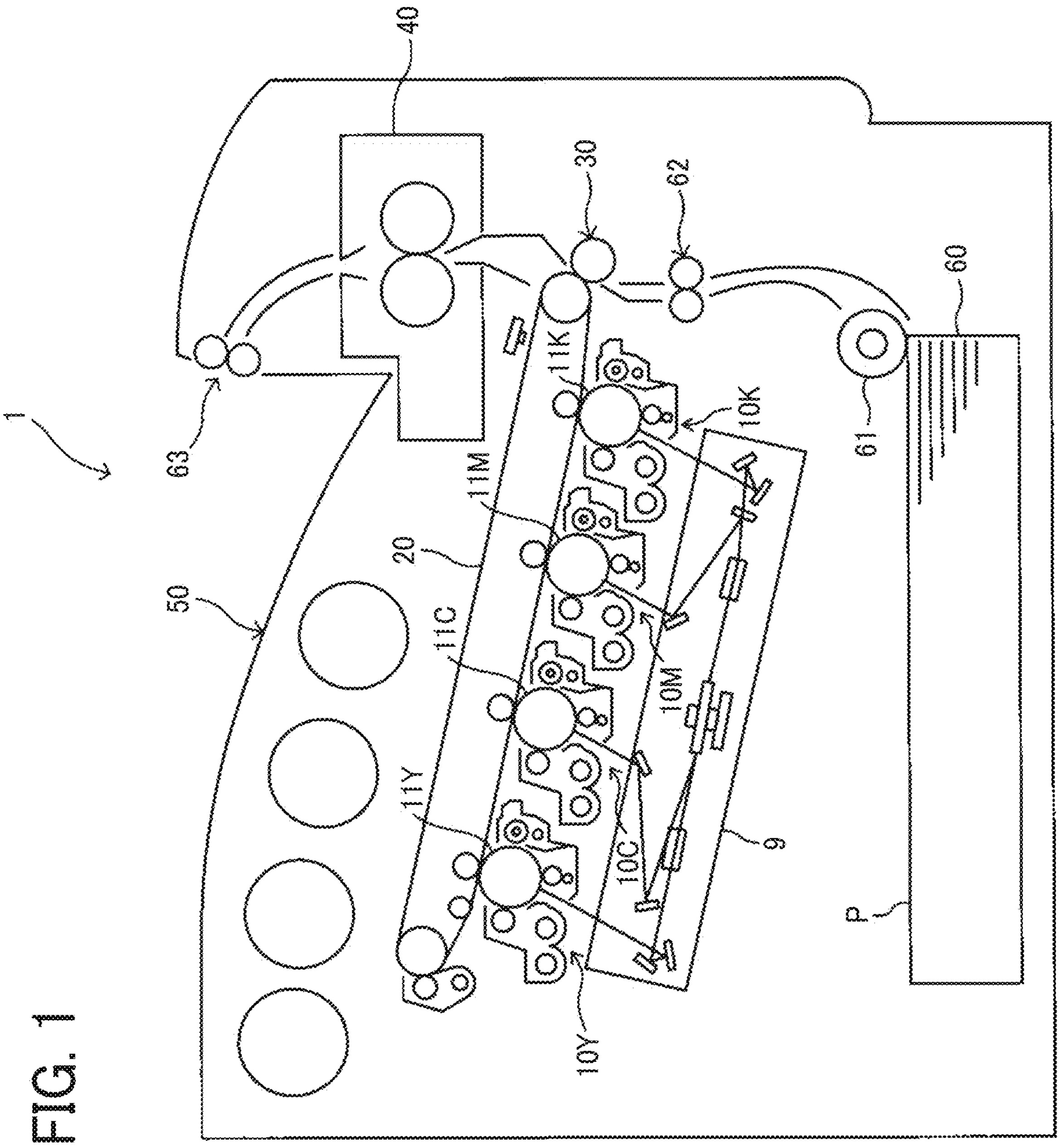
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A laser printer is described below as an electrophotographic image forming apparatus according to an embodiment of the present disclosure. FIG. 1 is a diagram illustrating a schematic configuration of an image forming apparatus 1 according to the embodiment. The image forming apparatus 1 includes an image forming section 100 to form an image on a sheet P as a recording medium. The image forming apparatus 1 is a tandem-type image forming apparatus. The image forming section 100 includes image forming devices 10Y, 10M. 10C, and 10K for respective colors of yellow (Y), magenta (M), cyan (C), and black (K) and an intermediate transfer belt 20 as an intermediate transferor. The image forming devices 10Y, 10M, 10C, and 10K are arranged along a rotation direction of the intermediate transfer belt 20 on the intermediate transfer belt 20. The image forming devices 10Y, 10M, 10C, and 10K include photoconductors 11Y, 11M, 11C, and 11K as latent image bearers, respectively.

Each of the image forming devices 10Y, 10M, 10C, and 10K includes a charging device as a charger, an optical writing device 9 as an electrostatic-latent-image forming device, and a developing device around each of the photoconductors 11Y, 11M, 11C, and 11K. In addition, each of the image forming devices 10Y, 10M, 10C, and 10K includes a primary transfer device as a primary transferor and a cleaning device as a cleaner around each of the photoconductors 11Y, 11M, 11C, and 11K. The charging device uniformly charges the surface of the photoconductor to a predetermined potential. The optical writing device 9 irradiates the surface of the photoconductor uniformly charged by the charging device with light based on image data to form an electrostatic latent image. The developing devices develop the electrostatic latent images on the photoconductors to form toner images of toners of respective colors (yellow, magenta, cyan, and black), respectively, which is referred to as a developing process. The primary transfer device transfers the toner image on the photoconductor onto the intermediate transfer belt 20. The cleaning device removes residual toner that is not transferred onto the intermediate transfer belt and remains on the photoconductor to clean the surface of the photoconductor.

The primary transfer devices primarily transfer color toner images formed on the photoconductors 11Y, 11M, 11C, and 11K onto the intermediate transfer belt 20 to superimpose the color toner images on the intermediate transfer belt 20, forming a four-color toner image on the intermediate transfer belt 20. Rotation of the intermediate transfer belt conveys the four-color toner image on the intermediate transfer belt 20 to a secondary transfer area in which the four-color toner image faces a secondary transfer device 30.

The image forming apparatus includes a sheet tray 60 below the image forming section 100. The sheet tray 60 holds sheets P and serves as a feeding section for feeding the sheet P. A pickup roller 61 feeds the sheets P one by one from the sheet tray 60 to a conveyance path. A registration roller pair 62 conveys the sheet P to the secondary transfer area along the conveyance path.

The registration roller pair 62 conveys the sheet P to the secondary transfer area at a predetermined timing at which the four-color toner image on the intermediate transfer belt 20 reaches the secondary transfer area, and the secondary transfer device 30 secondarily transfer the four-color toner image from the intermediate transfer belt 20 onto the sheet P. The sheet P on which the four-color toner image is formed is then conveyed to a fixing device 40, and the fixing device 40 applies heat and pressure to the sheet P to fix the four-color toner image onto the sheet P. After the four-color toner image is fixed onto the sheet P, the sheet P is conveyed along the conveyance path, and an output roller pair 63 ejects the sheet P to an output tray 50.

Figure 2:
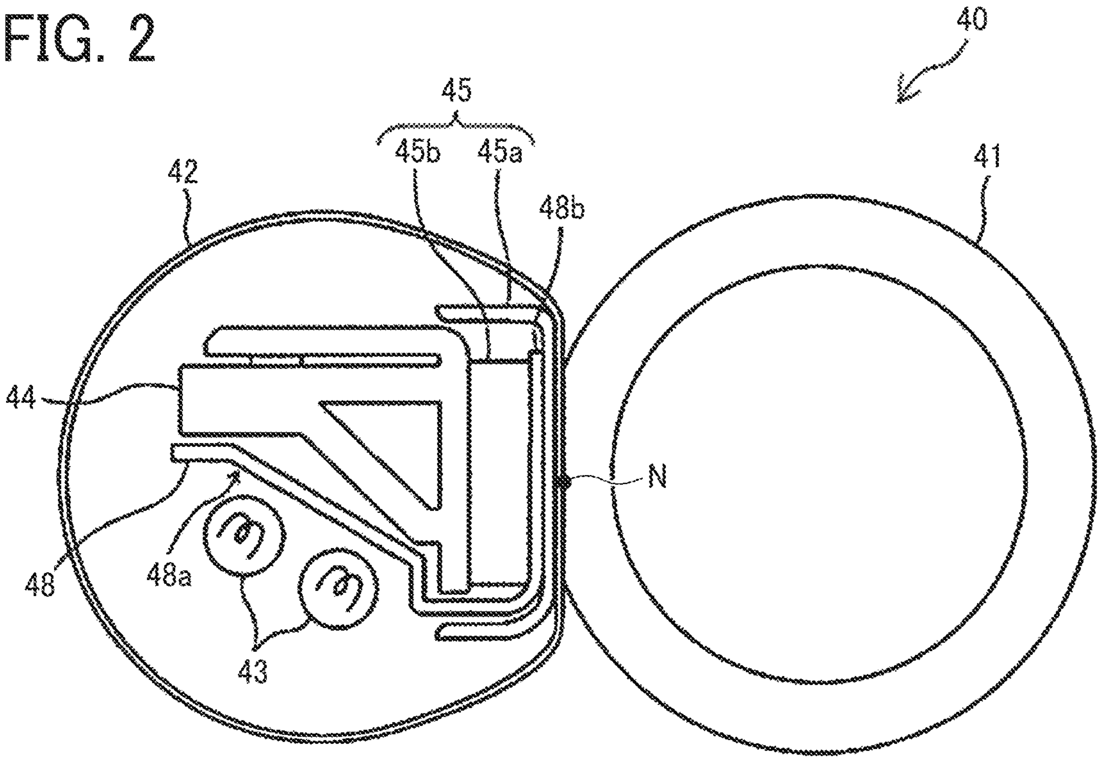
FIG. 2 is a schematic diagram illustrating a configuration of a fixing device incorporated in the image forming apparatus of FIG. 1.

FIG. 2 is a schematic diagram illustrating a configuration of the fixing device 40 incorporated in the image forming apparatus of FIG. 1.

The fixing device 40 includes a pressure roller 41 serving as a pressure rotator, a fixing belt 42 serving as a fixing rotator, and a heat source 43 that is, for example, halogen heaters as illustrated in FIG. 2 and applies the heat and pressure to the sheet P to fix the toner image onto the sheet P.

The fixing device 40 includes a stay 44 and a nip formation pad 45 held by the stay 44 that are disposed inside the loop of the fixing belt 42.

The nip formation pad 45 includes a thermal equalizer 45*a* and a resin pad 45*b*. The thermal equalizer 45*a* serves as a fixing nip support facing a nip, a heat transfer member, and a slid member. The resin pad 45*b* serves as a nip support base supporting the thermal equalizer 45*a*. One of the functions of the resin pad 45*b* is thermal insulation to reduce heat transferred from the fixing belt 42 to the stay 44 via the nip formation pad 45 and prevent warm-up time and a Typical Electricity Consumption (TEC) value from increasing. As another function of the resin pad 45*b*, the resin pad 45*a* receives a pressing force of the pressure roller 41 to prevent deformation of the thermal equalizer 45*a*. The thermal equalizer 45*a* has, for example, a pad shape extending in a width direction of the fixing belt 42. The thermal equalizer 45*a* is disposed to equalize the temperature distribution in the fixing belt in an axial direction of the fixing belt. The thermal equalizer transfers heat from a high temperature portion of the fixing belt 42 to a low temperature portion of the fixing belt 42 to equalize the temperature distribution in the fixing belt 42 in the axial direction.

In FIG. 2, a nip N has a flat shape but may have a concave shape or other shapes. The nip having the concave shape causes the direction in which the leading end of the sheet P is ejected from the nip to be the direction toward the pressure roller, which improves separation of the sheet P from the fixing belt 42 and prevents the occurrence of a sheet jam.

The thermal equalizer 45*a* is made of metal such as aluminum or copper and has a high thermal conductivity of 50 [W/m·K] or more, and the surface of the thermal equalizer 45*a* is coated with a coating having an excellent sliding property. Examples of the material for the coating include resin-based materials such as polyimide resin, fluororesin, polyphenylene sulfide resin, and saturated polyester resin. The above-described resin-based coating material may be mixed with glass fiber, carbon, graphite, graphite fluoride, carbon fiber, molybdenum disulfide, fluororesin, or the like.

Alternatively, metal-based coating material may be used. Examples of the metal-based coating materials include molybdenum disulfide, nickel, and composite plating of nickel and fluorine resin. In addition, the metal-based coating material may be anodized aluminum or anodized aluminum impregnated with a resin or a metal. Ceramics may also be used as the coating material. Examples of the ceramic used as the coating material include silicon carbide ceramic, silicon nitride ceramic, alumina ceramic, and mixtures thereof with molybdenum disulfide, fluorine resin, and the like.

Alternatively, forming an anodized aluminum layer on the surface layer of the thermal equalizer 45*a* made of aluminum or aluminum alloys and filling the fine pores of the anodized aluminum layer with molybdenum disulfide generated by secondary electrolysis from the deepest portions of the fine pores to the outermost surface layer forms the excellent coating.

The thermal equalizer **45*a* having a high thermal conductivity in the present embodiment is made of a material having a thermal conductivity equal to or higher than the thermal conductivity of aluminum and is processed as described above. Thus, the thermal equalizer 45*a*** having the high thermal conductivity is produced.

The pressure roller 41 includes a metal roller, a silicone rubber layer on the outer circumferential face of the metal roller, and a release layer on the outer circumferential face of the silicone layer. The release layer is made of perfluoroalkoxy alkane (PFA) or polytetrafluoroethylene (PTFE) to obtain releasability. A spring or the like presses the pressure roller 41 against the fixing belt 42 to deform the silicone rubber layer. As a result, the nip has a predetermined nip width.

A driver such as a motor is disposed in the image forming apparatus and transmits driving force to the pressure roller 41 through gears to rotate the pressure roller 41. The pressure roller 41 transmits the driving force to the fixing belt 42 at the nip to rotate the fixing belt 42.

The pressure roller 41 may be a solid roller but is preferably hollow because the hollow roller has a small thermal capacity. The pressure roller 41 may include a heater such as the halogen heater. The silicone rubber layer of the pressure roller 41 may be made of solid rubber. Alternatively, if no heater is situated inside the pressure roller 41, the silicone rubber layer of the pressure roller 41 may be made of sponge rubber. The sponge rubber is preferable to the solid rubber because the sponge rubber has enhanced thermal insulation that draws less heat from the fixing belt 42.

The fixing belt 42 is an endless belt or film and includes a base layer made of a metal material, such as nickel or steel use stainless (SUS), or a resin material, such as polyimide. The surface layer of the fixing belt 42 has a release layer. The release layer is made of perfluoroalkoxy alkane (PFA), polytetrafluoroethylene (PTFE), or the like to facilitate separation of toner of the toner image on the sheet P from the fixing belt 42, thus preventing the toner of the toner image from adhering to the fixing belt 42.

An elastic layer made of, e.g., silicone rubber may be interposed between the base layer and the release layer in the fixing belt 42. Omitting the elastic layer made of silicone rubber reduces thermal capacity and enhances fixability. However, the slight surface roughness of the fixing belt 42 may be transferred onto a recording medium while a toner image is fixed onto the recording medium, causing an orange-peel image, which is an image having uneven gloss in a solid part of the image. To address this circumstance, the elastic layer made of silicone rubber has a thickness not smaller than 100 micrometers. Deformation of the elastic layer made of silicone rubber absorbs the slight surface roughness of the fixing belt 42, preventing formation of the orange-peel image.

The stay 44 has a hollow pipe-shaped metal body made of metal such as aluminum, iron, or stainless steel. In the present embodiment, a cross-sectional shape of the stay 44 has a rectangular shape but may have another cross-sectional shape. The stay 44 prevents bending of the nip formation pad 45 that receives pressure from the pressure roller 41 and uniformly forms the nip width in the axial direction of the pressure roller 41.

The heat source 43 to raise the temperature of the fixing belt 42 includes two heaters disposed inside the loop of the fixing belt 42. The two heaters of the heat source 43 in the present embodiment are halogen heaters and directly heat the inner circumferential face of the fixing belt 42 with radiant heat. As long as the heat source 43 can heat the fixing belt 42, the heat source 43 may include one of various types of heaters such as a heater including an induction heating (IH) coil, a resistive heat generator, or a carbon heater.

The fixing device 40 includes a reflector 48 inside the loop of the fixing belt 42. The reflector 48 reflects the radiant heat from the heat source 43 to the fixing belt 42 to reduce the loss of the radiant heat. The reflector 48 is made of a high-luminance aluminum or the like, which includes a base made of a high-purity aluminum material as a metal to obtain a high reflectance, for example, a reflectivity of 95% or more. The base has a surface layer including a plurality of reflection enhancing films and protective films. Depending on the configuration, silver may be deposited on an aluminum plate by vapor deposition to further improve the reflectance.

The reflector 48 according to the present embodiment includes a reflecting portion **48*a* and a pressure receiving portion 48*b*. The reflecting portion 48*a* reflects the radiant heat toward the fixing belt 42. The pressure receiving portion 48*b* serves as a contacting portion contacting the thermal equalizer 45*a*. Specifically, the pressure roller 41 applies the pressing force to a receiving portion of the thermal equalizer 45*a* as the fixing nip support via the fixing belt 42. The receiving portion of the thermal equalizer 45*a* faces the nip and extends in a direction orthogonal to the pressing direction of the pressure roller 41 and receives the pressing force from the pressure roller 41. The pressure receiving portion 48*b* as the contacting portion of the reflector 48 contacts the receiving portion of the thermal equalizer 45*a* as the fixing nip support. The reflecting portion 48*a* is disposed between the heat source 43 and the stay 44. The pressure receiving portion 48*b* is interposed between the thermal equalizer 45*a* as the slid member and the resin pad 45*b*. The pressure receiving portion 48*b*** extends from one end to the other end of the nip N.

Figure 3:
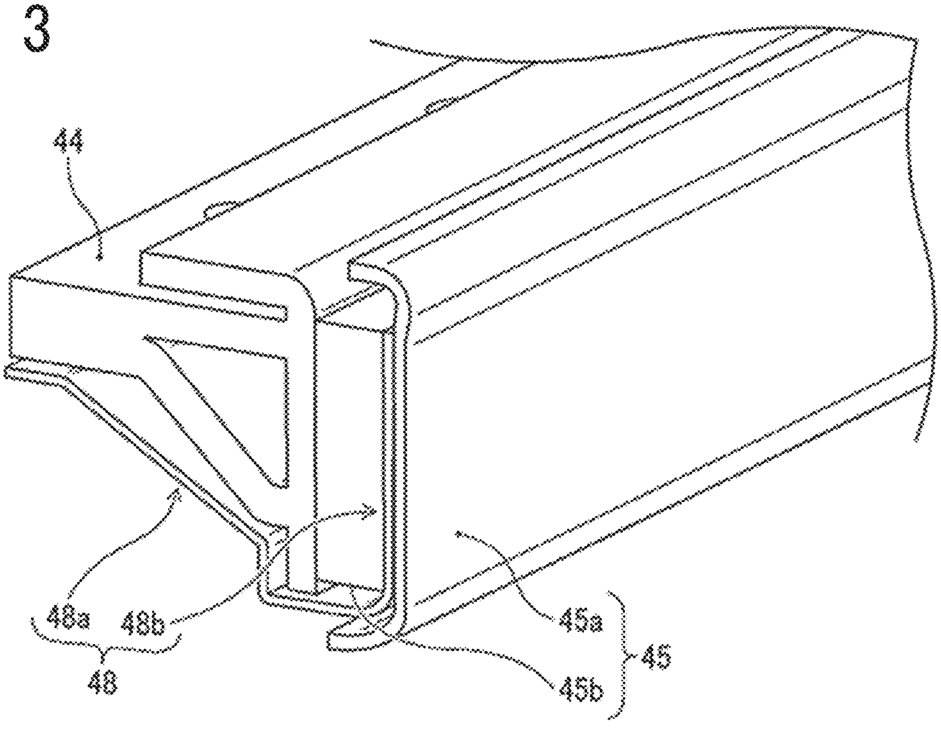
FIG. 3 is a partial perspective view of a reflector, a nip formation pad, and a stay that are assembled.

FIG. 3 is a partial perspective view of the reflector 48, the nip formation pad 45, and the stay 44 that are assembled.

As illustrated in FIG. 3, the pressure receiving portion **48*b* of the reflector 48 is held by being sandwiched between the thermal equalizer 45*a* and the resin pad 45*b*, and a portion other than the pressure receiving portion 48*b* in the reflector 48 is not in contact with a member around the reflector 48**.

Figure 4:
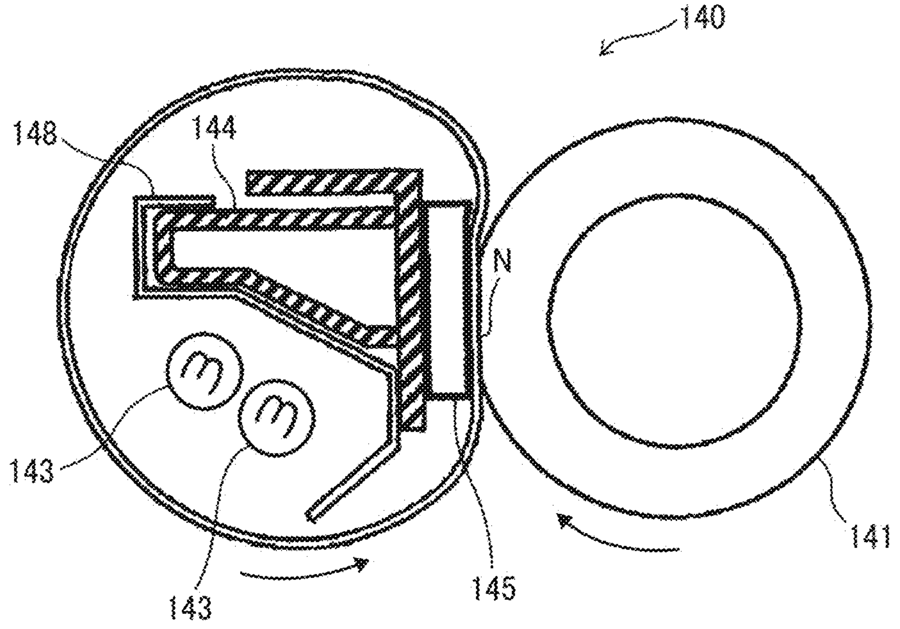
FIG. 4 is a schematic diagram illustrating a configuration of a fixing device according to a comparative example.

FIG. 4 is a schematic diagram illustrating a configuration of a fixing device according to a comparative example.

As illustrated in FIG. 4, a reflector 148 in the fixing device according to the comparative example does not include the pressure receiving portion **48*b***.

The reflector 148 has a reflectance of about 95 to 98% and cannot reflect 100% of the radiant heat of a heat source 143. The reflector 148 itself slightly absorbs the radiant heat. As a result, the temperature of the reflector 148 gradually increases. In particular, continuously fixing a large number of toner images onto a large number of sheets in the fixing device according to the comparative example illustrated in FIG. 4 increases the temperature of the reflector 148 to about 300° C. to 400° C. Applying a certain heat load or more to the reflector 148 causes tarnish of the aluminum or silver layer of the reflector 148. The tarnish decreases the reflectance of the reflector 148 and deteriorates the performance of the reflector 148. In the worst case, the tarnish may affect the safety of the fixing device. To avoid the above-described disadvantages, the productivity of the fixing device according to the comparative example is limited so that a certain heat load is not applied to the reflector 148. In other words, the fixing device according to the comparative example creates a bottleneck in improving productivity of the image forming apparatus.

In contrast, the reflector 48 in the present embodiment includes the pressure receiving portion 48*b* extending to a region between the thermal equalizer 45*a* and the resin pad 45*b*, and the region receives the pressure from the pressure roller 41 as described with reference to FIGS. 2 and 3. Since the reflector 48 is made of metal having good thermal conductivity such as aluminum as described above, heat absorbed in the reflecting portion 48*a* quickly transmits to the entire reflector 48. The heat of the reflector 48 transfers from the pressure receiving portion 48*b* to the thermal equalizer 45*a* because the pressure receiving portion 48*b* is in contact with the thermal equalizer 45*a*, preventing temperature increase in the reflector 48. After the heat of the reflector 48 transfers to the thermal equalizer 45*a*, the heat transfers from the thermal equalizer 45*a* to the fixing belt 42 and is used for melting toner. The above-described configuration can more effectively use the heat of the reflector 48 than a configuration in which another member such as the stay 44 dissipates the heat of the reflector 48. As a result, the above-described configuration can shorten a lighting time of the heat source 43 and reduce power consumption.

The pressure receiving portion 48*b* contacts the receiving portion of the thermal equalizer 45*a*, and the receiving portion receives the pressing force from the pressure roller 41. The pressure causes the thermal equalizer 45*a* to be in close contact with the pressure receiving portion 48*b* to enhance heat transfer performance. As a result, the pressure receiving portion 48*b* can effectively dissipate the heat of the reflector 48. In addition, the thermal equalizer 45*a* and the reflector 48 made of metal having good thermal conductivity can effectively dissipate the heat of the reflector 48 to the fixing belt 42.

The pressure receiving portion 48*b* extends from a position facing one end of the nip to a position facing the other end of the nip in a sheet conveyance direction and contacts a half or more of a portion of the thermal equalizer 45*a*, and the portion receives the pressure from the pressure roller 41 and corresponds to the nip. The above-described structure can give a sufficient close contact area of the pressure receiving portion 48*b* that is in close contact with the thermal equalizer 45*a* and further effectively dissipate the heat of the reflector 48.

As illustrated in FIGS. 2 and 3, a clearance is formed between the reflector 48 and the bent portion of the thermal equalizer 45*a*, and a clearance is formed between the reflector 48 and the stay 44. As a result, the reflector 48 is not in contact with the bent portion of the thermal equalizer 45*a* and the stay 44. The above-described structure can prevent heat transfer from the reflector 48 to the bent portion of the thermal equalizer 45*a* and the stay 44, which are unnecessary in terms of effective use of heat.

The above-described structure enables the fixing device to prevent the temperature increase in the reflector 48, effectively use the heat of the reflector 48, and reduce power consumption.

Since the thermal equalizer 45*a* is coated with the above-described coating having the excellent sliding property, the friction coefficient of the thermal equalizer 45*a* with respect to the inner circumferential face of the fixing belt 42 is smaller than the friction coefficient of the face of the pressure receiving portion 48*b* with respect to the inner circumferential face of the fixing belt 42. Thus, the sliding resistance of the fixing belt can be reduced as compared with a case in which the pressure receiving portion 48*b* of the reflector 48 is brought into contact with the inner circumferential face of the fixing belt 42 to dissipate the heat of the reflector 48 to the fixing belt 42 without passing through the thermal equalizer 45*a*. The above-described structure prevents an increase in torque for rotating the fixing belt 42 and abrasion of the inner circumferential face of the fixing belt 42.

If the pressure receiving portion 48*b* of the reflector 48 is coated with the coating having the excellent sliding property to be in contact with the inner circumferential face of the fixing belt 42, the following disadvantage may be expected. If the coating material having the excellent sliding property adheres to the reflecting portion 48*a* of the reflector 48, the reflectance of the reflecting portion 48*a* may decrease. To avoid adhesion of the coating material having the excellent sliding property to the reflecting portion 48*a*, for example, it is necessary to apply masking or the like to the reflecting portion 48*a*. Applying the masking to the reflecting portion 48*a* needs processes such as a process to apply the masking, a process to remove the masking, and a process to remove an adhesive for masking adhered to the reflecting portion 48*a*. It is very difficult for a machine to perform these processes. If the machine that performs these processes can be made, the machine will be expensive.

In contrast, transmitting the heat of the reflector 48 to the fixing belt 42 via the thermal equalizer 45*a* as described in the present embodiment does not need the excellent slidability of the reflector 48 with respect to the inner circumferential face of the fixing belt 42. Accordingly, it is not necessary to apply the coating having the excellent sliding property to the pressure receiving portion 48*b*, which prevents manufacturing difficulty and an increase in cost.

Figure 5A:
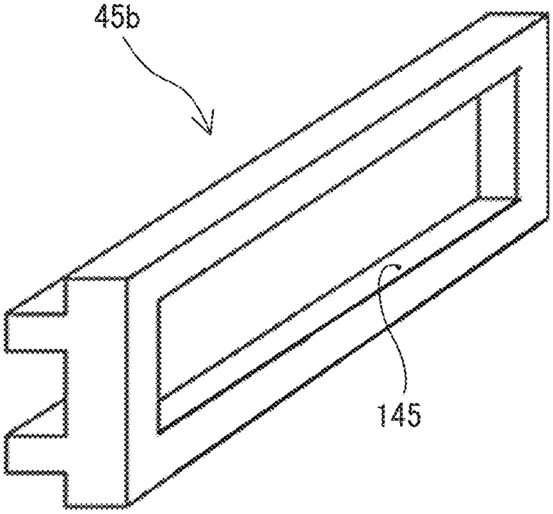
FIG. 5A is a schematic perspective view of one example of a resin pad.
Figure 5B:
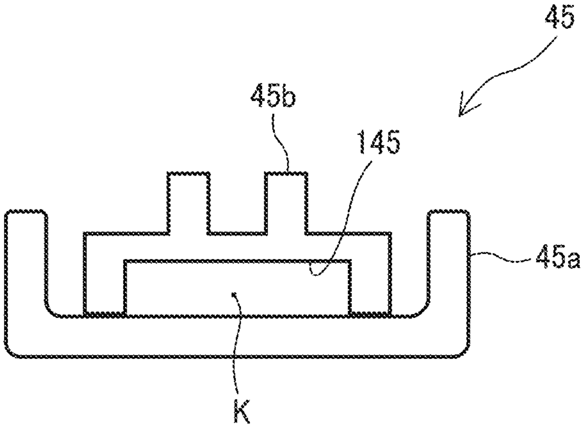
FIG. 5B is a schematic cross-sectional view of a nip formation pad including the resin pad of FIG. 5A.

FIG. 5A is a schematic perspective view of the resin pad 45*b*, and FIG. 5B is a schematic cross-sectional view of the nip formation pad 45.

The resin pad 45*a* has a rectangular recess 145 facing the thermal equalizer 45*a*. As illustrated in FIG. 5B, the recess 145 forms an air layer K having an excellent thermal insulation property between the thermal equalizer 45*a* and the resin pad 45*b*, which can favorably reduce heat transfer from the fixing belt 42 to the stay 44 via the nip formation pad 45. As a result, the resin pad 45*b* as the nip support base is made of thermal insulation material having higher thermal insulation property than the metal that is the material of the thermal equalizer as the fixing nip support. As a result, the above-described structure can favorably prevent the warm-up time and the TEC value from increasing.

Figure 6A:
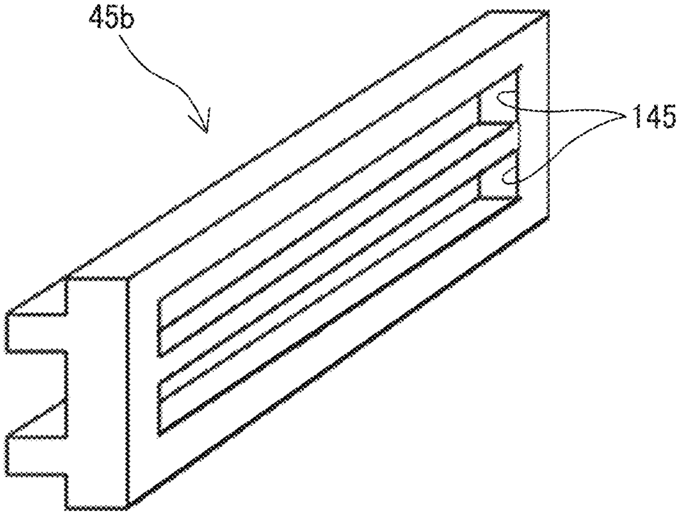
FIG. 6A is a schematic perspective view of another example of the resin pad.
Figure 6B:
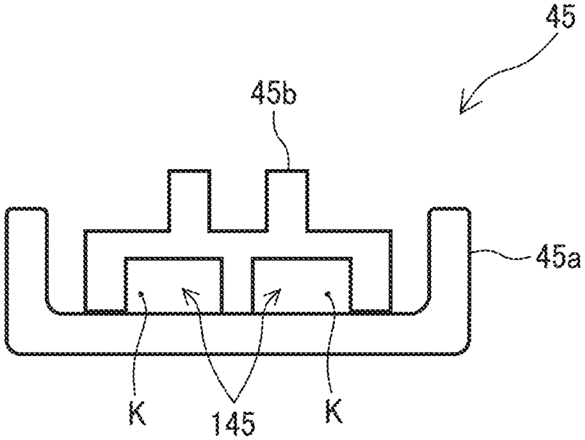
FIG. 6B is a schematic cross-sectional view of a nip formation pad including the resin pad of FIG. 6A.

The structure of the resin pad 45*b* is not limited to the structure illustrated in FIGS. 5A and 5B. For example, as illustrated in FIGS. 6A and 6B, the resin pad 45*b* may include a partition wall extending in a sheet-width direction that is the longitudinal direction of the resin pad 45*b* and being at the center of the resin pad 45*b* in the sheet conveyance direction and have multiple recesses 145. The structure illustrated in FIGS. 6A and 6B has a higher pressure resistance against the pressing force of the pressure roller 41 than the structure illustrated in FIGS. 5A and 5B. In addition to the structure illustrated in FIGS. 6A and 6B, a partition wall extending in the sheet conveyance direction that is a short-side direction of the resin pad 45*b* may be further added to further increase the number of the recesses 145.

Figure 7:
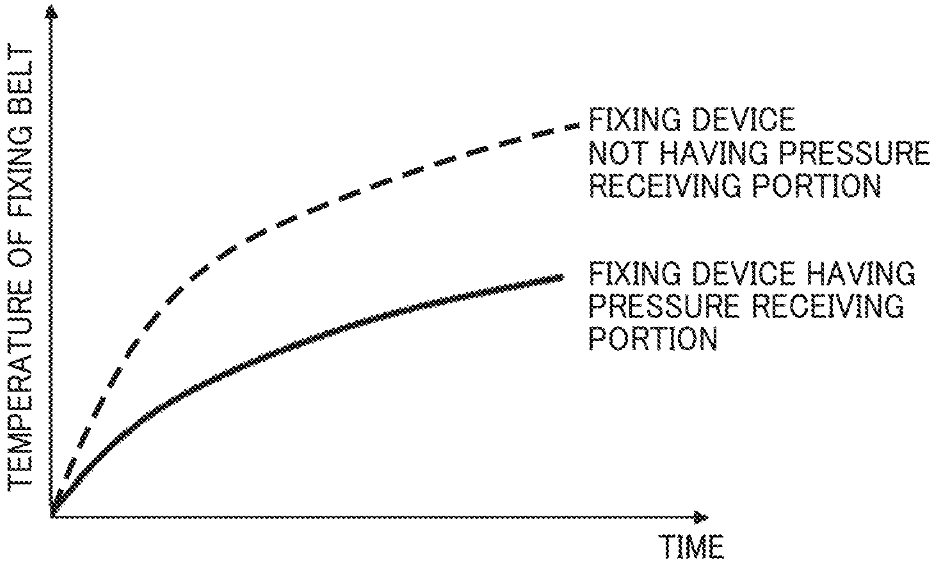
FIG. 7 is a graph illustrating a temperature change of a fixing belt during a warm-up period.

FIG. 7 is a graph illustrating a temperature change of the fixing belt 42 during a warm-up period.

In FIG. 7, a dashed line indicates the temperature change of the fixing belt 42 in the fixing device according to the comparative example including the reflector 48 not having the pressure receiving portion 48*b* as illustrated in FIG. 4, and a solid line indicates the temperature change of the fixing belt 42 in the fixing device including the reflector 48 having the pressure receiving portion 48*b*.

As can be seen from FIG. 7, a temperature rising speed of the fixing belt 42 during the warm-up period in the fixing device including the reflector 48 with the pressure receiving portion 48*b* is slower than the temperature rising speed of the fixing belt 42 during the warm-up period in the fixing device including the reflector 48 not having the pressure receiving portion 48*b*. The reason is considered as follows. The temperature of the reflector 48 is low during the warm-up period after a main power switch of the image forming apparatus is turned on. For this reason, the pressure receiving portion 48*b* of the reflector 48 absorbs the heat of the fixing belt 42 and the thermal equalizer 45*a*. As a result, it is considered that the temperature rising speed of the fixing belt 42 during the warm-up period in the fixing device having the pressure receiving portion 48*b* is reduced compared to the fixing device not having the pressure receiving portion 48*b*.

In order to solve the above-described disadvantage regarding a decrease in the temperature raising speed, using the heat source 43 having a high output (that is, the heater having a high rated power) and increasing power applied to the heat source 43 may be considered. However, a usable electric power is determined in the image forming apparatus, and increasing the power applied to the heat source 43 is limited.

Figure 8:
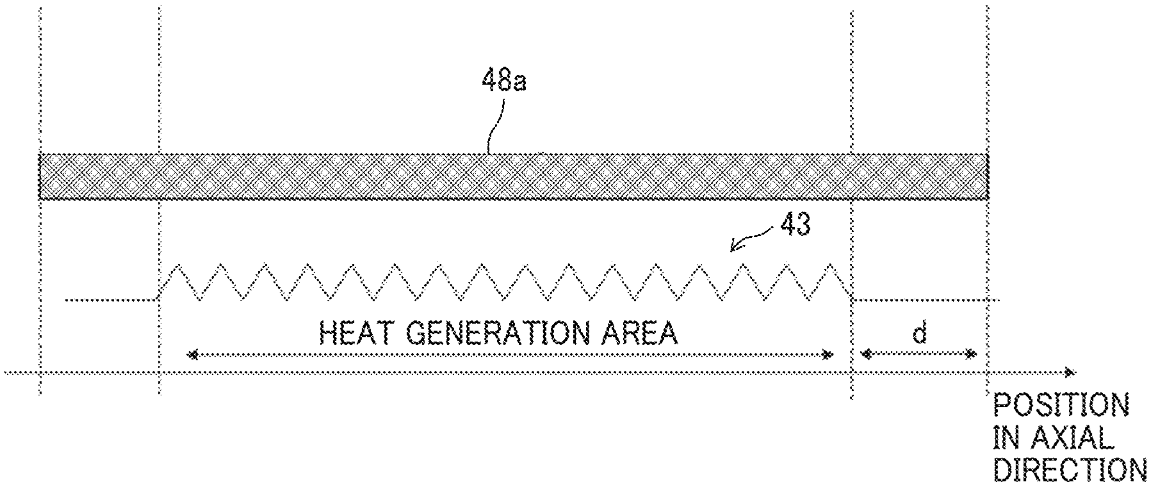
FIG. 8 is a diagram illustrating a relationship between the reflector and a heat generation area of a heat source in the fixing device of FIG. 2.

In the present embodiment, the heat generation area of the heat source 43 is shorter than the reflecting portion 48*a* of the reflector 48 in a width direction of the recording medium as illustrated in FIG. 8. In this specification, the width direction of the recording medium is defined as the direction orthogonal to the recording medium conveyance direction in which the recording medium is conveyed. In the present embodiment, a distal end of the heat generation area of the heat source 43 in the width direction is positioned away from a distal end of the reflecting portion 48*a* in the width direction toward the center of the heat generation area by d (mm), which is referred to as an end distance d, in the width direction as illustrated in FIG. 8. As a result, the length of the heat generation area in the width direction is shorter than the length of the reflecting portion 48*a* in the width direction by 2*d* (mm). In other words, the heat source 43 and the reflector 48 are parallel with each other in the width direction, and each end of the heat generation area in the width direction is the interior of corresponding one of the ends of the reflection portion 48*a* in the width direction.

The above-described structure increases the watt density of the heat source 43. Increasing the watt density increases a heat generation amount per unit area in the heater without increasing the electric power applied to the heat source 43. The heat source 43 in the present embodiment includes two heaters. The heat generation area of the heat source 43 is obtained by combining two heat generation areas of the two heaters.

Figure 9:
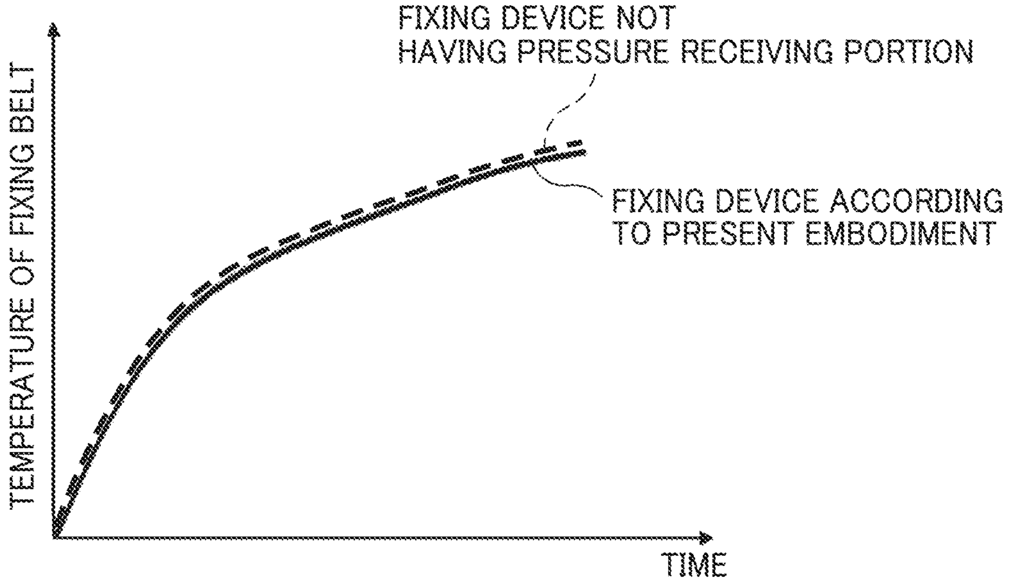
FIG. 9 is a graph illustrating a temperature change of the fixing belt during the warm-up period in the fixing device of FIG. 2 including the heat source having the heat generation area shorter than a reflecting portion of the reflector in the width direction.

FIG. 9 is a graph illustrating a temperature change of the fixing belt 42 during the warm-up period in the fixing device according to the present embodiment including the heat source 43 having the heat generation area shorter than the reflecting portion 48*a* of the reflector 48 in the width direction.

The heat source 43 in the present embodiment has the heat generation area shorter than the reflecting portion 48*a* of the reflector 48 in the width direction to increase the heat generation amount per unit area generated by the heat source 43. Designing the length of the heat generation area of the heat source 43 to be shorter than the length of the reflecting portion 48*a* of the reflector 48 in the width direction reduces radiant heat radiated to a member other than the fixing belt by the heat source 43 and radiant heat reflected to the member other than the fixing belt by the reflecting portion 48*a*, thereby reducing wasteful consumption of the heat energy of the heat source 43. The above-described structure can efficiently heat the fixing belt 42. As a result, as illustrated in FIG. 9, the temperature rising speed of the fixing belt 42 during the warm-up period in the fixing device according to the present embodiment is substantially equal to that in the fixing device according to the comparative example illustrated in FIG. 4 including the reflector 48 not having the pressure receiving portion 48*b*.

Figure 10:
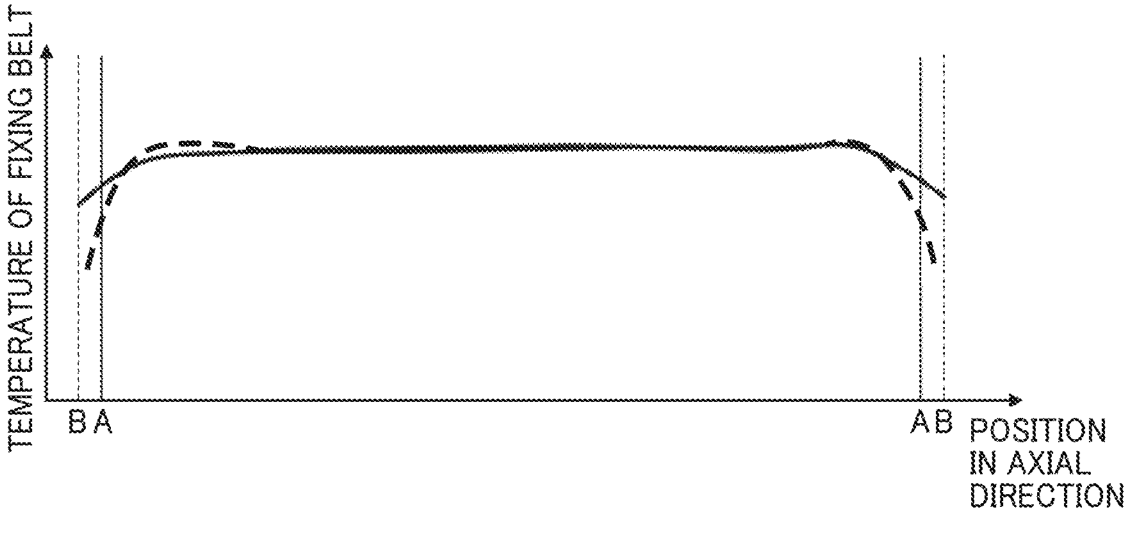
FIG. 10 is a graph illustrating a temperature distribution of the fixing belt at the end of the warm-up period in the fixing device of FIG. 2 including the heat source having the heat generation area shorter than the reflecting portion of the reflector in the width direction.

FIG. 10 illustrates a temperature distribution of the fixing belt at the end of a warm-up of the fixing device including the heat source 43 having the heat generation area shorter than the reflecting portion 48*a* of the reflector 48 in the width direction.

The dashed line in FIG. 10 illustrates a temperature distribution of the fixing belt 42 in the fixing device according to the comparative example including the reflector 48 not having the pressure receiving portion 48*b* as illustrated in FIG. 4, and the solid line illustrates the temperature distribution of the fixing belt 42 in the fixing device according to the present embodiment.

In FIG. 10, two lines each indicated by "A" mean both end positions of the sheet having a maximum size, 320 mm×450 mm (that is referred to as SRA3 in Japan) that can be passed by the image forming apparatus. The length of the sheet having the maximum size in the width direction is 320 mm. In FIG. 10, two lines each indicated by "B" mean both end positions of the fixing belt 42, and the length of the fixing belt 42 in the width direction is 350 mm. The length of the reflecting portion 48*a* of the reflector 48 in the width direction is 350 mm that is the same as the length of the fixing belt 42 in the width direction. The length of the beat generation area of the heat source 43 in the width direction is 333 mm.

Designing the heat generation area of the heat source 43 shorter than the reflecting portion 48*a* of the reflector 48 in the width direction reduces the amount of heat directly applied from the heat source 43 to the end of the fixing belt 42 and the amount of heat applied from the heat source 43 to the end of the fixing belt 42 by reflection at the reflecting portion 48*a*. As a result, temperature decrease in the lateral end spans occurs as illustrated by a dashed line in FIG. 10 in the fixing device according to the comparative example not having the pressure receiving portion 48*b* when the beat generation area of the heat source 43 is designed to be shorter than the reflecting portion 48*a* of the reflector 48 in the width direction to reduce wasteful consumption of the heat energy of the heat source 43 and enhance heating efficiency of the heat source 43 to heat the fixing belt 42. Shortening the heat generation area of the heat source 43 reduces the radiant heat directly irradiated from the heat source 43 to each of the lateral end spans of the fixing belt 42 and the radiant heat irradiated from the reflector 48 to each of the lateral end spans of the fixing belt 42. As a result, the temperature of the fixing belt 42 at each of the lateral end spans becomes lower than the temperature of the fixing belt 42 at the center of the fixing belt 42 at the end of the warm-up, that is, the temperature decreases at the lateral end spans occurs.

In contrast, the fixing device according to the present embodiment includes the reflector 48 having the pressure receiving portion 48*b*. The pressure receiving portion 48*b* can transfer heat from the reflector 48 to the lateral end spans of the fixing belt 42 via the thermal equalizer 45*a*. At the initial stage of the warm-up, the temperature of the reflector 48 is lower than the temperature of the fixing belt 42. Therefore, the heat transfers from the fixing belt 42 to the reflector 48 via the thermal equalizer 45*a*. However, as the warm-up proceeds, the temperature of the reflector 48 exceeds the temperature of the lateral end span of the fixing belt 42. After the temperature of the reflector 48 exceeds the temperature of the lateral end span of the fixing belt 42, heat transfers from the reflector 48 to the lateral end span of the fixing belt 42 via the thermal equalizer 45*a*. As a result, even if the heat source 43 having the heat generation area shorter than the reflecting portion 48*a* of the reflector 48 in the width direction reduces the amount of heat applied directly from the heat source 43 to the lateral end spans of the fixing belt 42 and the amount of heat applied by reflection at the reflecting portion 48*a*, the above-described structure can favorably reduce the temperature decrease in the lateral end spans of the fixing belt 42 at the end of the warm-up as illustrated by the solid line in FIG. 10. As described above, the fixing device in the present embodiment includes the heat source 43 having the heat generation area shorter than the reflector 48, which reduces the wasteful consumption of thermal energy of the heat source 43 and enhances the heating efficiency. In addition, the above-described structure in the present embodiment can reduce the temperature decrease at the lateral end spans of the fixing belt. The above-described structure can prevent the temperature rising speed during the warm-up period from decreasing and can satisfactorily reduce the temperature decrease at the lateral end spans of the fixing belt at the end of the warm-up.

The following describes experiments conducted by the present inventors.

The present inventors produced fixing devices having different end distances d each of which is between the distal end of the heat generation area and the distal end of the reflecting portion 48*a* as described above. The fixing device was installed into the image forming apparatus, and the image forming apparatus performed the warm-up. A temperature distribution of the fixing belt 42 in each of the fixing devices was measured at the end of the warm-up to investigate the optimum end distance d. Specifically, multiple heat sources 43 having different heat generation areas were prepared, and each of the multiple heat sources 43 was set in the fixing device 40 including the fixing belt 42 having a length of 350 mm in the width direction, the reflector 48 including the reflecting portion 48*a* having the length of 350 mm in the width direction, and the pressure receiving portion 48*b* having the length of 340 mm in the width direction. Under an environment of normal temperature and normal humidity (23° C., 50%), the specified power was applied to the heat source 43, and the image forming apparatus performed the warm-up. At the end of the warm-up, the temperature distribution of the fixing belt 42 in the width direction was measured.

Figure 11:
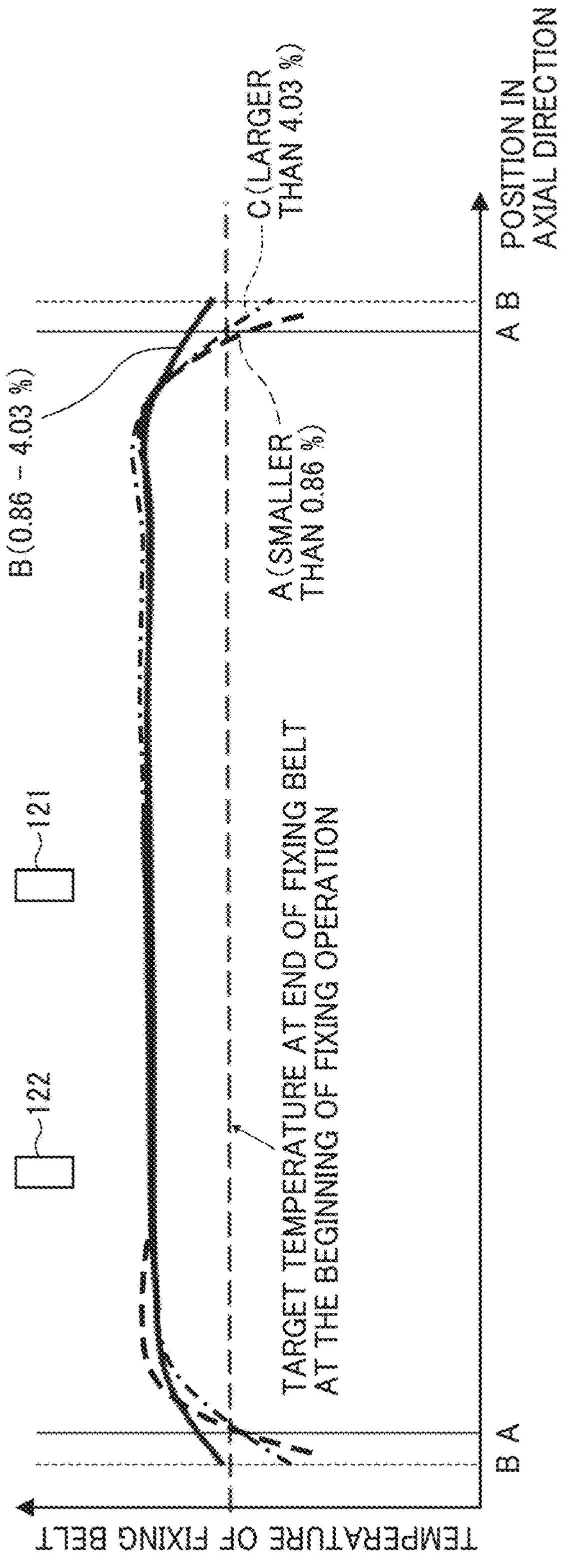
FIG. 11 is a graph illustrating temperature distributions of fixing belts at the end of the warm-up period in fixing devices having different ratios each of which is a ratio of a distance from an end of the heat generation area to an end of a reflector to a length of the reflector.
Figure 12:
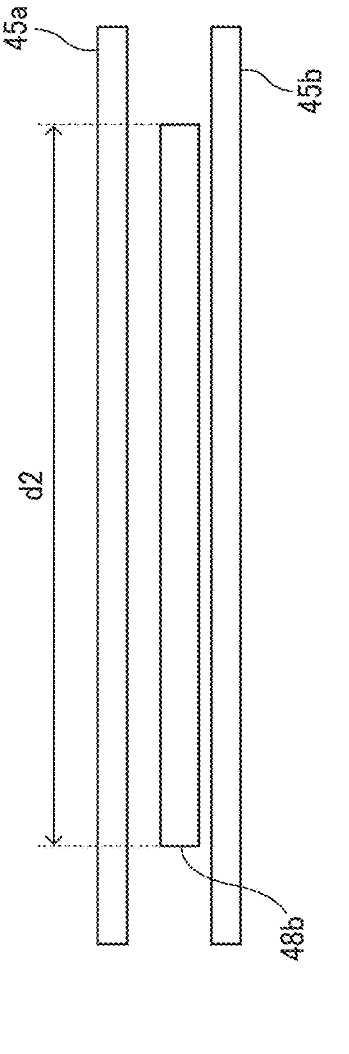
FIG. 12 is a schematic diagram illustrating an example of a length of a pressure receiving portion in the width direction.

As illustrated in FIG. 11, a temperature sensor 121 was disposed to face the center of the fixing belt 42 in the width direction, and a temperature sensor 122 was disposed away from the temperature sensor 121 in the width direction by 120 mm. During the warm-up period, the temperature sensors 121 and 122 measured temperatures of the fixing belt 42. In response to temperatures detected by the temperature sensors 121 and 122 that reach predetermined temperatures, the warm-up was completed.

FIG. 11 is a graph illustrating the results of the experiments. The temperature decrease at the lateral end spans of the fixing belt is largest immediately after the warm-up. A target temperature at the end of the fixing belt at the beginning of a fixing operation in FIG. 11 is defined as a temperature at which cold offset does not occur immediately after the warm-up at the end of the sheet in the width direction, the sheet having the maximum width of widths of the sheets that can pass through the image forming apparatus, and the image forming apparatus can favorably form the image on the sheet. If the cold offset occurs, the image forming apparatus cannot favorably form the image. To prevent the occurrence of the cold offset, a first print time is increased.

In FIG. 11, a dashed line A (SMALLER THAN 0.86%) expresses the temperature distribution of the fixing belt in the fixing device having the ratio of the end distance d to the length of the reflecting portion 48*a* in the width direction that is smaller than 0.86%. In this case, the temperature of the fixing belt 42 at a position facing the end of the sheet having the maximum width of widths of the sheets that can pass through the fixing device (that is, 320 mm of the SRA3 size) was lower than the target temperature at the end of the fixing belt at the beginning of a fixing operation. This means that members other than the fixing belt are irradiated with the heat of the heat source 43, the thermal energy of the heat source 43 is wastefully consumed, and the heating efficiency is insufficient. In other words, it can be considered that the amount of heat transferred from the reflector 48 to the lateral end span of the fixing belt 42 is insufficient after the temperature of the reflector 48 exceeds the temperature of the lateral end span of the fixing belt 42, and therefore, the temperature of the fixing belt 42 at the position facing the end of the sheet at the end of the warm-up becomes lower than the target temperature at the end of the fixing belt at the beginning of a fixing operation.

In FIG. 11, an alternate long and short dash line C (LARGER THAN 4.03%) expresses the temperature distribution of the fixing belt in the fixing device having the ratio of the end distance d to the length of the reflecting portion 48*a* of the reflector 48 in the width direction that exceeds 4.03%. In this case, the temperature of the fixing belt 42 at the position facing the end of the sheet having the largest width at the end of the warm-up was also lower than the target temperature at the end of the fixing belt at the beginning of a fixing operation. It is considered that the short heat generation area had a high heating efficiency, but the radiant heat radiated by the heat source 43 and the radiant heat radiated by the heat source 43 and reflected by the reflector 48 did not sufficiently reach the lateral end spans of the fixing belt 42. As a result, it is considered that the temperature of the fixing belt 42 at the position facing the end of the sheet at the end of the warm-up becomes lower than the target temperature at the end of the fixing belt at the beginning of a fixing operation.

In FIG. 11, a solid line B (0.86-4.03%) expresses the temperature distribution of the fixing belt in the fixing device having the ratio of the end distance d to the length of the reflecting portion 48*a* of the reflector 48 in the width direction that is 0.86% to 4.03%. In this case, the temperature of the fixing belt 42 at the position facing the end of the sheet having the largest width at the end of the warm-up was equal to or larger than the target temperature at the end of the fixing belt at the beginning of a fixing operation. Accordingly, the cold offset does not occur in the image formed at the end of the sheet in the width direction, and the image forming apparatus can favorably form the image on the sheet even when the image forming apparatus forms the image immediately after the warm-up on the sheet having the largest width of widths of the sheets that can pass through the image forming apparatus.

Similar experiments were conducted in a so-called A4 image forming apparatus through which the sheet having a width of 210 mm as the maximum width can pass. The width of 210 mm is the vertical size of A4 sheet defined by the Japanese Industrial Standard. Note that the above-described image forming apparatus through which the SRA3 size sheet can pass is referred to as an A3 image forming apparatus in this specification. Fixing devices having different ratios of different end distances d to the length of the reflecting portion 48*a* of the reflector 48 in the width direction were produced to investigate optimum ratios in the A4 image forming apparatus. Table 1 below illustrates the results of the experiments in the A3 image forming apparatus and the A4 image forming apparatus, which give optimum values of the ratios of the end distances d to the lengths of the reflecting portions 48*a* of the reflectors 48 in the width direction in the A3 image forming apparatus and the A4 image forming apparatus.

TABLE 1

| A3 IMAGE FORMING APPARATUS | | A4 IMAGE FORMING APPARATUS | |
|---|---|---|---|
| RATIO OF END DISTANCE d (mm) TO LENGTH (mm) OF REFLECTOR | OCCURRENCE OF COLD OFFSET | RATIO OF END DISTANCE d (mm) TO LENGTH (mm) OF REFLECTOR | OCCURRENCE OF COLD OFFSET |
| SMALLER THAN 0.86% | OCCUR | SMALLER THAN 0% | OCCUR |
| 0.86% TO 4.03% | NOT OCCUR | 0% TO 2.61% | NOT OCCUR |
| LARGER THAN 4.03% | OCCUR | LARGER THAN 2.61% | OCCUR |

As illustrated in Table 1, in the A4 image forming apparatus, setting the ratio of the end distance d to the length of the reflecting portion 48*a* of the reflector 48 in the width direction to be from 0% to 2.61% can set the temperature of the fixing belt 42 at the end of the warm-up at the position facing the end of the sheet having the largest width of widths of the sheets that can pass through the image forming apparatus to be equal to or higher than the target temperature at the end of the fixing belt at the beginning of the fixing operation. As a result, the cold offset does not occur in the image formed at the end of the sheet in the width direction, and the image forming apparatus can favorably form the image on the sheet even when the image forming apparatus forms the image immediately after the warm-up on the sheet having the largest width of widths of the sheets that can pass through the image forming apparatus.

The following describes experiments conducted to investigate the relationship between the widthwise length d2 of the pressure receiving portion 48*b* of the reflector 48 and the end distance d.

Three reflectors 48 having different lengths d2 of the pressure receiving portion 48*b* that are 330 mm, 340 mm, and 350 mm were produced for the A3 image forming apparatus. Similarly, the three reflectors 48 having different lengths d2 of the pressure receiving portion 48*b* that are 220 mm, 230 mm, and 240 mm were produced for the A4 image forming apparatus. Each of the reflectors was assembled to the fixing devices having various end distances d described above. At the end of the warm-up, the temperature distribution of the fixing belt 42 in the width direction was measured in each of the fixing devices to investigate the optimum ratios of the end distances d to the length of each of the reflectors in the width direction. The results were as follows in Tables 2 and 3.

TABLE 2

| A3 IMAGE FORMING APPARATUS | | A4 IMAGE FORMING APPARATUS | |
|---|---|---|---|
| d2 (mm) | RATIO OF END DISTANCE d (mm) TO LENGTH (mm) OF REFLECTOR | d2 (mm) | RATIO OF END DISTANCE d (mm) TO LENGTH (mm) OF REFLECTOR |
| 330 | 0.83% or more | 220 | 0% or more |
| 340 | 0.86% or more | 230 | 0% or more |
| 350 | 0.89% or more | 240 | 0.11% or more |

TABLE 3

| A3 IMAGE FORMING APPARATUS | | A4 IMAGE FORMING APPARATUS | |
|---|---|---|---|
| d2 (mm) | RATIO OF END DISTANCE d (mm) TO LENGTH (mm) OF REFLECTOR | d2 (mm) | RATIO OF END DISTANCE d (mm) TO LENGTH (mm) OF REFLECTOR |
| 330 | LESS THAN 3.91% | 220 | LESS THAN 2.50% |
| 340 | LESS THAN 4.03% | 230 | LESS THAN 2.61% |
| 350 | LESS THAN 4.15% | 240 | LESS THAN 2.72% |

As illustrated in Table 2, in the A3 image forming apparatus including the pressure receiving portion 48*b* having a widthwise length d2 equal to the widthwise length of the reflecting portion 48*a* that is 350 mm, the temperature of the fixing belt 42 at the end of the warm-up at the position facing the end of the sheet having the largest width of widths of the sheets that can pass through the image forming apparatus is below the target temperature at the end of the fixing belt at the beginning of the fixing operation if the ratio of the end distance d to the length of the reflecting portion 48*a* of the reflector 48 in the width direction is not 0.89% or more. This is because the longer the length d2 of the pressure receiving portion 48*b* in the width direction is, the more the amount of heat required to raise the temperature of the reflector 48 is. In other words, the amount of heat required to raise the temperature of the reflector 48 including the pressure receiving portion 48*b* having a long length d2 in the width direction is larger than the amount of heat required to raise the temperature of the reflector 48 including the pressure receiving portion 48*b* having a short length d2 in the width direction. As a result, in the fixing device having the length d2 of 350 mm, it takes time for the temperature of the reflector 48 to exceed the temperature of the end of the fixing belt 42 unless setting the above-described ratio of the end distance d to 0.89% or more enhance the heating effect to be higher than that of the fixing device having the length d2 of 330 mm or 340 mm. As a result, it is considered that the reflector 48 cannot supply sufficient heat to increase the temperature at the lateral end spans of the fixing belt 42 during the warm-up, and the temperature of the fixing belt at the position facing the end of the sheet having the largest width at the end of the warm-up becomes lower than the target temperature at the end of the fixing belt at the beginning of the fixing operation.

On the other hand, in the fixing device including the pressure receiving portion 48*b* having the length d2 of 330 mm in the width direction and the ratio of the end distance d to the length of the reflecting portion 48*a* of the reflector 48 in the width direction that is 0.83% or more, the temperature of the fixing belt at the position facing the end of the sheet having the largest width at the end of the warm-up is equal to or larger than the target temperature at the end of the fixing belt at the beginning of the fixing operation. This is because the pressure receiving portion 48*b* having the short length d2 in the width direction decreases the amount of heat required to raise the temperature of the reflector 48 and enables quickly increasing the temperature of the reflector 48 to be higher than the temperature of the lateral end spans of the fixing belt 42 even if the ratio of the end distance d to the length of the reflecting portion 48*a* of the reflector 48 is 0.83%. As a result, it is considered that the reflector 48 can supply sufficient heat to increase the temperature at the lateral end spans of the fixing belt 42 during the warm-up, and the temperature of the fixing belt 42 at the position facing the end of the sheet having the largest width at the end of the warm-up becomes equal to or higher than the target temperature at the end of the fixing belt at the beginning of the fixing operation.

In the A4 image forming apparatus including the pressure receiving portion 48*b* having the length d2 in the width direction equal to the length of the reflecting portion 48*a* in the width direction that is 240 mm, the temperature of the fixing belt 42 at the end of the warm-up at the position facing the end of the sheet having the largest width is below the target temperature at the end of the fixing belt at the beginning of the fixing operation if the ratio of the end distance d to the length of the reflecting portion 48*a* of the reflector 48 in the width direction is not 0.11% or more.

As can be seen from Table 3, the longer the length d2 of the pressure receiving portion 48*b* is, the larger the upper limit value of the ratio of the end distance d can be. This is because the heat transfers from the reflector 48 to the lateral end span of the fixing belt 42 via the thermal equalizer 45*a* after the temperature of the reflector 48 exceeds the temperature of the lateral end span of the fixing belt 42. As a result, it is considered that the above-described structure can reduce the temperature decrease at the lateral end spans of the fixing belt 42 and set the temperature of the fixing belt 42 at the end of the warm-up at the position facing the end of the sheet having the largest width to the target temperature at the end of the fixing belt at the beginning of the fixing operation even when the ratio of the end distance d is large, and even when the radiant heat directly irradiated from the heat source 43 to each of the lateral end spans of the fixing belt 42 and the radiant heat irradiated from the reflector 48 to each of the lateral end spans of the fixing belt 42 are reduced.

Similarly, in the A4 image forming apparatus, designing the length d2 of the pressure receiving portion 48*b* to be the same as the length of the reflecting portion 48*a* in the width direction (that is 240 mm) can increase the upper limit value of the ratio of the end distance d.

As described above, from Table 2 and Table 3, it was found that the length of the pressure receiving portion 48*b* in the width direction changes the optimum ratio of the end distance d that can set the temperature of the fixing belt at the end of the warm-up at the position facing the end of the sheet having the largest width to the target temperature at the end of the fixing belt at the beginning of the fixing operation.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of this disclosure.

The configurations according to the above-descried embodiments are examples, and embodiments of the present disclosure are not limited to the above. For example, the following aspects can achieve effects described below.

First Aspect

In a first aspect, a fixing device such as the fixing device 40 includes a fixing rotator such as the fixing belt 42, a pressure rotator such as the pressure roller 41, a fixing nip support such as the thermal equalizer 45*a*, a heat source such as the heat source 43, and a reflector such as the reflector 48. The pressure rotator contacts an outer face of the fixing rotator to form a nip through which a recording medium conveyed in a conveyance direction passes and presses the recording medium against the fixing rotator The fixing nip support has a receiving portion to receive a pressing force of the pressure rotator via the fixing rotator. The heat source is inside a loop of the fixing rotator and has a heat generation area. The heat generation area has a first length in a width direction orthogonal to the conveyance direction. The reflector includes a contacting portion and a reflecting portion. The contacting portion contacts the receiving portion of the fixing nip support. The reflecting portion faces the heat source to reflect radiant heat radiated by the heat source toward an inner face of the fixing rotator. The reflecting portion has a second length in the width direction longer than the first length of the heat generation area in the width direction.

In addition, the reflector in the first aspect contacts the receiving portion of the fixing nip support in which the pressure rotator applies the pressing force, and the pressing force of the pressure rotator brings the reflector into close contact with the fixing nip support.

As a result, the heat of the reflector having high temperature can be favorably transferred to the fixing nip support. During continuous printing, the temperature of the reflector becomes high, and the heat of the reflector can be satisfactorily transferred to the fixing belt via the fixing nip support. The above-described heat transfer can reduce temperature decrease in the fixing rotator during continuous printing, shorten a time in which the heat source is turned on to maintain the temperature of the fixing rotator to be a target temperature, and save energy.

However, the following disadvantage occurs when the reflector contacts the receiving portion of the fixing nip support that receives the pressing force of the pressure rotator to reduce the temperature decrease of the fixing rotator during continuous printing. The temperature rising speed of the fixing rotator during the warm-up period in the above-described structure is slower than that in the structure in which the reflector does not contact the fixing nip support because the heat of the fixing rotator and the fixing nip support transfers to the reflector having low temperature during the warm-up period.

In order to solve the above-described disadvantage, using the heat source 43 having a high output and a high rated power may be considered. However, usable power is determined in advance in the entire image forming apparatus, which limits increasing the output of the heat source.

In the first aspect, the length of the heat generation area of the heat source in the width direction orthogonal to the conveyance direction in which the recording medium is conveyed is designed to be shorter than the length of the reflecting portion of the reflector in the width direction. The above-described structure can increase the watt density, which is the electric power per unit surface area of the heat source, to be larger than a watt density of the heat source having a length equal to or longer than the length of the reflector in the width direction. In addition, the above-described structure can reduce wasteful energy consumption due to the radiant heat radiated to members other than the fixing rotator and the reflector, such as the stay and not used to heat the fixing rotator. The above-described structure can enhance the heating efficiency of the heat source to heat the fixing rotator and prevent the temperature rising speed of the fixing rotator during warm-up from decreasing.

Second Aspect

In a second aspect, the fixing device according to the first aspect includes a nip support base such as the resin pad 45*b* supporting the fixing nip support. The nip support base is made of thermal insulation material having higher thermal insulation property than a material of the fixing nip support such as the thermal equalizer 45*a*.

According to the second aspect, the nip support base can receive the pressing force of the pressure rotator applied to the fixing nip support. As a result, the deformation of the fixing nip support can be reduced.

The nip support base made of the thermal insulation material having higher thermal insulation property than the material of the fixing nip support can reduce heat transfer from the fixing nip support to the stay and prevent the temperature rising speed of the fixing rotator during the warm-up period from decreasing. As described embodiments, the structure according to the second aspect can prevent the stay 44 from absorbing the heat of the fixing rotator such as the fixing belt 42 and prevent warm-up time and a Typical Electricity Consumption (TEC) value from increasing.

Third Aspect

In a third aspect, the fixing device according to the first aspect or the second aspect includes a nip support base such as the resin pad 45*b* supporting the fixing nip support. The nip support base such as the resin pad 45*b* contacts the pressure rotator such as the pressure roller 41 via the contacting portion of the reflector and the receiving portion of the fixing nip support such as the thermal equalizer 45*a*.

As described in the embodiment, the above-described structure according to the third aspect can reduce deformation of the fixing nip support such as the thermal equalizer 45*a*.

Fourth Aspect

In a fourth aspect, the contacting portion of the reflector such as the reflector 48 in the fixing device according to any one of the first to third aspects has a half or more length of the receiving portion of the fixing nip support such as the thermal equalizer 45*a* in the conveyance.

As described in the embodiment, the above-described structure according to the fourth aspect can sufficiently obtain a contact area in which the contacting portion such as the pressure receiving portion 48*b* contacts the fixing nip support such as the thermal equalizer 45*a* and enhance the heat discharging property of the reflector such as the reflector 48.

Fifth Aspect

In a fifth aspect, the heat source such as the heat source 43 and the reflector such as the reflector 48 in the fixing device according to any one of the first to fourth aspects are parallel with each other in the width direction, and each end of the heat generation area in the width direction is inside of corresponding one of ends of the reflecting portion of the reflector in the width direction.

The above-described structure according to the fifth aspect can shorten the heat generation area of the heat source such as the heat source 43 in the width direction and favorably heat the end of the fixing rotator such as the fixing belt 42. The above-described structure can increase the watt density and the temperature rising speed of the fixing rotator during the warm-up period and reduce the temperature decrease at the lateral end spans of the fixing rotator at the end of the warm-up.

Sixth Aspect

In a sixth aspect, the heat generation area of the heat source in the fixing device according to any one of the first to fifth aspects has a first end and a second end in the width direction, the reflecting portion such as the reflecting portion 48*a* has a third end and a fourth end in the width direction, the first end is closer to the third end than the fourth end, the second end is closer to the fourth end than the third end, and a ratio of an end distance from the first end to the third end in the width direction to the second length of the reflecting portion such as the reflecting portion 48*a* in the width direction is 0.86% or more and 4.03% or less for the fixing device fixable the recording medium having a maximum width of 320 mm in the width direction.

As described with reference to Table 1, the above-described structure according to the sixth aspect can increase the temperature rising speed of the fixing rotator during the warm-up period and reduce the temperature decrease at the lateral end spans of the fixing rotator at the end of the warm-up.

Seventh Aspect

In a seventh aspect, the contacting portion such as the pressure receiving portion 48*b* of the reflector such as the reflector 48 in the fixing device according to the sixth aspect has a third length such as the length d2 of the contacting portion in the width direction is equal to the second length of the reflecting portion such as the reflecting portion 48*a* of the reflector in the width direction, and the ratio of the end distance such as the distance d to the second length of the reflecting portion such as the reflecting portion 48*a* of the reflector in the width direction is 0.89% or more.

As described with reference to Table 2, the above-described structure according to the seventh aspect can reduce the temperature decrease at the lateral end spans of the fixing rotator at the end of the warm-up.

Eighth Aspect

In an eighth aspect, the contacting portion such as the pressure receiving portion 48*b* of the reflector such as the reflector 48 in the fixing device according to the sixth aspect or the seventh aspect has a third length shorter than the second length of the reflecting portion such as the reflecting portion 48*a* of the reflector such as the reflector 48 in the width direction, and the ratio of the end distance to the second length of the reflecting portion such as the reflecting portion 48*a* of the reflector such as the reflector 48 in the width direction is smaller than 3.91%.

As described with reference to Table 3, the above-described structure according to the eighth aspect can reduce the temperature decrease at the lateral end spans of the fixing rotator at the end of the warm-up.

Ninth Aspect

In a ninth aspect, the heat generation area in the fixing device according to any one of the first to fifth aspects has a first end and a second end in the width direction, the reflecting portion such as the reflecting portion 48*a* has a third end and a fourth end in the width direction, the first end is closer to the third end than the fourth end, the second end is closer to the fourth end than the third end, and a ratio of an end distance from the first end to the third end in the width direction to the second length of the reflecting portion such as the reflecting portion 48*a* of the reflector such as the reflector 48 in the width direction is 2.61% or less for the fixing device fixable the recording medium having a maximum width of 210 mm in the width direction.

As described with reference to Table 1, the above-described structure according to the sixth aspect can increase the temperature rising speed of the fixing rotator during the warm-up period and reduce the temperature decrease at the lateral end spans of the fixing rotator at the end of the warm-up.

Tenth Aspect

In a tenth aspect, the contacting portion of the reflector such as the reflector 48 in the fixing device according to the ninth aspect has a third length such as the length d2 equal to the second length of the reflecting portion such as the reflecting portion 48*a* of the reflector such as the reflector 48 in the width direction, and the ratio of the end distance such as the distance d to the second length of the reflecting portion such as the reflecting portion 48*a* of the reflector such as the reflector 48 in the width direction is 0.11% or more.

As described with reference to Table 2, the above-described structure according to the eighth aspect can reduce the temperature decrease at the lateral end spans of the fixing rotator at the end of the warm-up.

Eleventh Aspect

In an eleventh aspect, the contacting portion such as the pressure receiving portion 48*b* of the reflector such as the reflector 48 in the fixing device according to the ninth aspect or the tenth aspect has a third length shorter than the second length of the reflecting portion such as the reflecting portion 48*a* of the reflector such as the reflector 48 in the width direction, and the ratio of the end distance such as the distance d to the second length of the reflecting portion such as the reflecting portion 48*a* of the reflector such as the reflector 48 in the width direction is smaller than 2.50%.

As described with reference to Table 3, the above-described structure according to the eighth aspect can reduce the temperature decrease at the lateral end spans of the fixing rotator at the end of the warm-up.

Twelfth Aspect

In a twelfth aspect, an image forming apparatus includes the fixing device according to any one of the first to eleventh aspects and an image forming section to be fixed by the fixing device on the recording medium.

According to the twelfth aspect, the image forming apparatus can prevent power consumption from increasing and obtain a good image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A fixing device comprising:
- a fixing rotator;
- a pressure rotator contacting an outer face of the fixing rotator to form a nip through which a recording medium conveyed in a conveyance direction passes, the pressure rotator pressing the recording medium against the fixing rotator;
- a fixing nip support having a receiving portion to receive a pressing force of the pressure rotator via the fixing rotator;
- a heat source inside a loop of the fixing rotator, the beat source having a heat generation area having a first length in a width direction orthogonal to the conveyance direction; and
- a reflector including:
  - a contacting portion contacting the receiving portion of the fixing nip support; and
  - a reflecting portion facing the heat source to reflect radiant heat radiated by the beat source toward an inner face of the fixing rotator, the reflecting portion having a second length in the width direction longer than the first length of the heat generation area in the width direction.

2. The fixing device according to claim 1, further comprising
- a nip support base supporting the fixing nip support,
- wherein the nip support base is made of thermal insulation material having higher thermal insulation property than a material of the fixing nip support.

3. The fixing device according to claim 1, further comprising
- a nip support base supporting the fixing nip support,
- wherein the nip support base contacts the pressure rotator via the contacting portion of the reflector and the receiving portion of the fixing nip support.

4. The fixing device according to claim 1,
- wherein the contacting portion of the reflector has a half or more length of the receiving portion of the fixing nip support in the conveyance direction.

5. The fixing device according to claim 1,
- wherein the heat source and the reflector are parallel with each other in the width direction, and
- each end of the heat generation area in the width direction is inside of corresponding one of ends of the reflecting portion of the reflector in the width direction.

6. The fixing device according to claim 1,
- wherein the heat generation area of the heat source has a first end and a second end in the width direction,
- the reflecting portion of the reflector has a third end and a fourth end in the width direction,
- the first end is closer to the third end than the fourth end, the second end is closer to the fourth end than the third end, and a ratio of an end distance from the first end to the third end in the width direction to the second length of the reflecting portion in the width direction is 0.86% or more and 4.03% or less for the fixing device fixable the recording medium having a maximum width of 320 mm in the width direction.

7. The fixing device according to claim 6, wherein the contacting portion of the reflector has a third length equal to the second length of the reflecting portion of the reflector in the width direction, and the ratio of the end distance to the second length of the reflecting portion of the reflector in the width direction is 0.89% or more.

8. The fixing device according to claim 6, wherein the contacting portion of the reflector has a third length shorter than the second length of the reflecting portion of the reflector in the width direction, and the ratio of the end distance to the second length of the reflecting portion of the reflector in the width direction is smaller than 3.91%.

9. The fixing device according to claim 1, wherein the heat generation area has a first end and a second end in the width direction, the reflecting portion has a third end and a fourth end in the width direction, the first end is closer to the third end than the fourth end, the second end is closer to the fourth end than the third end, and a ratio of an end distance from the first end to the third end in the width direction to the second length of the reflecting portion of the reflector in the width direction is 2.61% or less for the fixing device fixable the recording medium having a maximum width of 210 mm in the width direction.

10. The fixing device according to claim 9, wherein the contacting portion of the reflector has a third length equal to the second length of the reflecting portion of the reflector in the width direction, and the ratio of the end distance to the second length of the reflecting portion of the reflector in the width direction is 0.11% or more.

11. The fixing device according to claim 9, wherein the contacting portion of the reflector has a third length shorter than the second length of the reflecting portion of the reflector in the width direction, and the ratio of the end distance to the second length of the reflecting portion of the reflector in the width direction is smaller than 2.50%.

12. An image forming apparatus comprising:

the fixing device according to claim 1; and an image forming section to form an image to be fixed by the fixing device on the recording medium.

* * * * *